INVENTOR.
Warren E. Bottenberg
BY
Scofield, Kokjer, Scofield & Lowe
ATTORNEYS.

Sept. 28, 1965    W. E. BOTTENBERG    3,208,207
ROTARY MOWER
Filed Sept. 10, 1962    2 Sheets-Sheet 2

INVENTOR.
Warren E. Bottenberg
BY Scofield, Kokjer, —field & Lowe
ATTORNEYS.

3,208,207
ROTARY MOWER
Warren E. Bottenberg, Holton, Kans., assignor to B-M-B Company, Inc., a corporation of Kansas
Filed Sept. 10, 1962, Ser. No. 222,477
8 Claims. (Cl. 56—25.4)

The present invention relates in general to rotary mowers, and it deals more particularly with heavy duty mowers of the type suited for agricultural field use and/or kindred uses requiring relatively high-speed, wide-swath mowing.

An object of the invention is to provide an improved mower which is adapted to be towed by a conventional farm tractor or the like, and which has dual mowing rotors driven by a single source of power, conveniently the power take-off of the towing tractor.

According to the invention, my mower will cut a swath essenially double the width of that which would be cut by either rotor acting alone; this is accomplished by positioning the two rotors in such side-by-side relation that an imaginary line drawn between their respective centers of rotation is at right angles to the path of travel of the mower, the orbits described by the tips of the blades on the respective rotors overlapping very slightly to insure that standing grass or other growth cannot pass uncut between the two.

In the past, mowers of this general type sometimes have been arranged so that the cutter blades on one rotor travel in a horizontal plane spaced above or below the plane of the blades on the other rotor so that there can be no collision or interference of blades in the region where their orbits overlap. However, it often is unsatisfactory for the two mowing rotors to cut at different heights above the ground, this being particularly true where, as contemplated by the present invention, the swath cut by each is quite wide, say six feet. Accordingly, in my mower, the cutter blades on both rotors are arranged to travel in the same generally horizontal plane so as to cut at uniform height.

An important feature of the invention, then, resides in the provision of an improved drive system for the two rotors, which, among other things, serves at all times to maintain the rotors in positive synchronization or phase relationship, whereby the aforementioned overlapping region of the two orbits is traversed in alternating sequence by blades of the respective rotors, insuring against collision of the blades, jamming or other interference between the two.

Multiple rotor mowers heretofore available generally have also had the shortcoming that much of the cut material was repeatedly recut, shredded or macerated; often this occurred, for example, by reason of the material being thrown by one rotor into the path of the other. In any event, such recutting, shredding or maceration of field crops usually is directly or indirectly deleterious to the nutrient content of the mowed material, and an important object of the invention therefore is to reduce recutting, etc, to a minimum.

At the same time, another object is to provide a dual rotor mower of the character indicated which, while minimizing recutting—and particularly the throwing of cut material from one rotor into the path of the other—causes all cut material to be discharged promptly through a single opening in the mower housing, the discharge from both rotors being commingled as it leaves the mower. The construction of the mower housing and the direction of rotation of the two mowing rotors are interrelated features involved in achieving these objectives. According to the invention, the single discharge opening is located in the rear of the housing, and the delivery of cut material thereto by both rotors is ideally suited for windrowing the material if such is desired; a specific windrowing attachment for aiding in this is dealt with in my copending application Serial No. 222,479, filed September 10, 1962.

Another object of the present invention is to provide, in the power train employed for driving the rotary cutters, means for readily changing the cutter speed and power at will, without altering the power delivered to the mower or the speed of its power input shaft. The power train of my machine comprises, in part, matched chain and sprocket drives for the respective rotors, and a further feature resides in the provision of a novel and simple arrangement for adjusting tension of both chains at the same time.

Still another object of the invention is to provide a rotary mower whose cutting height is readily adjustable without otherwise affecting the relationship between the cutting plane of the blades and the plane of the ground.

Yet another object is to provide a mower capable of cutting wide swaths, which has exceptional stability and can operate safely and efficiently at high mowing speeds. A related object is to make it possible for such a mower to execute 180° turns rapidly and easily at the edge of the area being mowed, thereby to minimize loss of time between the cutting of adjacent swaths across the field.

Additional objects of the invention, together with the features of novelty whereby the objects are achieved, will appear in the course of the following description.

In the drawings which form a part of the specification and are to be read in conjunction therewith, and in which like reference numerals refer to like parts of the various views.

Figure 1:
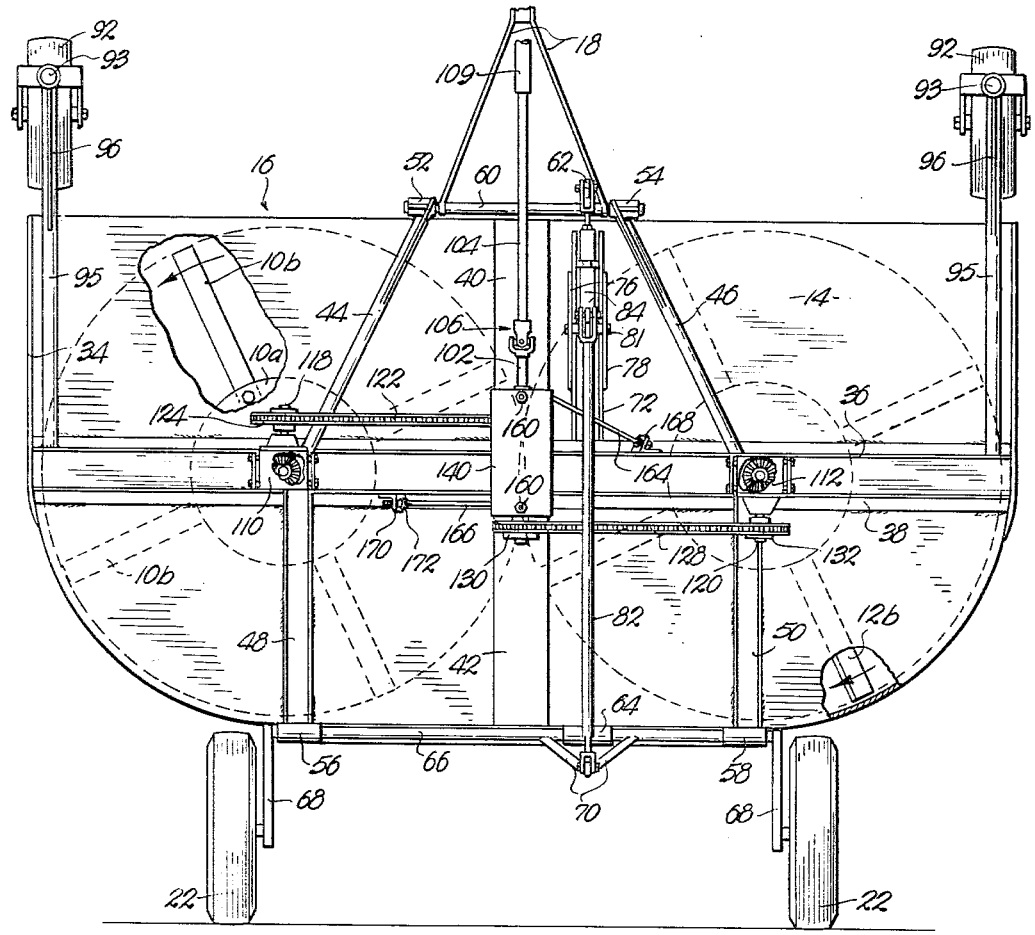
FIG. 1 is a plan view of a rotary mower constructed according to the invention, parts being broken away for purposes of illustration.

Referring more particularly to the drawings, my mower has a pair of rotary cutter assemblies 10 and 12 carried in side-by-side relation below the deck 14 of the mower housing 16. The front of the housing has a tongue 18 adapted to be connected to the hitch 20 of a conventional farm tractor (not shown) for the purpose of towing the mower behind the tractor. The hitch 20 also serves to support the front of the mower housing, while the rear of the housing is carried by a pair of trailing ground wheels 22.

As best seen in FIG. 1, deck 14 of the mower housing has a straight leading edge disposed transverse to the path of travel of the mower. Except for a narrow reinforcing flange 24 (FIG. 3) which extends the length of this edge, the cutting region 26 below the deck is entirely open at the front to facilitate entry of standing grass or other vegetation into the cutting region.

Figure 2:
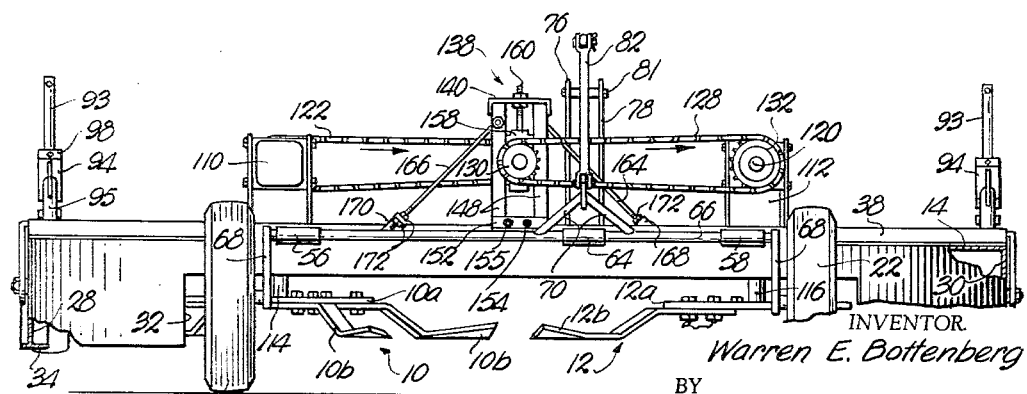
FIG. 2 is a rear-elevational view of same.
Figure 3:
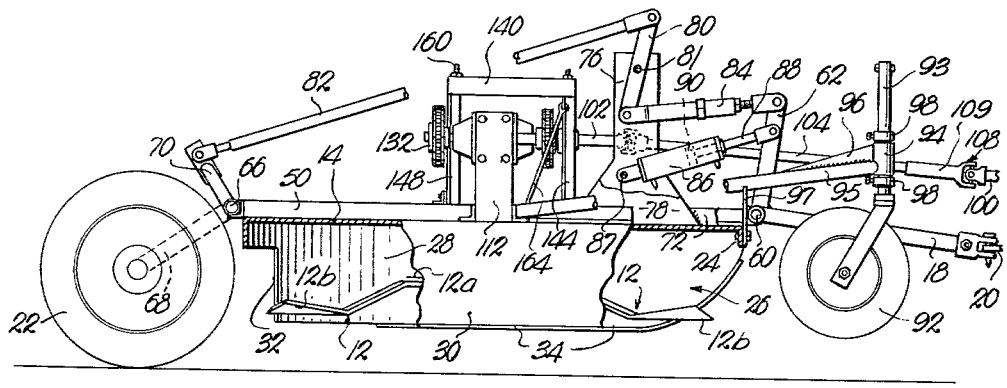
FIG. 3 is a side-elevational view of the mower with parts broken away for purposes of illustration.

The sides of the cutting region are enclosed, however, by a pair of skirts 28 and 30 rigidly depending from opposite lateral edges of the deck 14. As seen in FIGS. 2 and 3, this side skirting continues rearwardly and inwardly in a curve following the marginal curvature of the rear portion of deck 14 (FIG. 1), but across the rear of the housing the skirt is cut away to provide a relatively wide centrally located discharge opening 32 for the cut material.

Longitudinally extending skids or runners 34 are welded to the lowermost edges of the side skirts 28 and 30 ahead of the point where the latter begin to curve rearwardly toward one another. The forward portions of the skids are curved upwardly as shown in FIG. 3. The skids help to protect the housing from damage due to foreign objects or irregularities of terrain in their path, and they also prevent accidental lowering of the mower housing far enough to injure the cutter assemblies.

Cutter assembly 10 comprises a disk-shaped rotor or fly wheel 10a carrying radial cutter blades 10b; cutter assembly 12 comprises a similar rotor 12a carrying radial cutter blades 12b. Four blades are shown on each assembly, but the number can be varied, it being essential only that both assemblies have the same number of blades and that the blades of each assembly be positioned at equal circumferential intervals so that the assembly is dynamically balanced with reference to its center of rotation.

The sharpened cutting portions of blades 10b and 12b travel in the same horizontal plane, and the orbits described by their tips overlap slightly to avoid leaving any uncut grass along the longitudinal center line of the mower. Referring to FIG. 1, when the two cutter assemblies are driven as described hereinafter, blades 10b travel counterclockwise, while blades 12b travel clockwise. Also the two rotors are maintained in positive synchronization at all times so that there can be no possibility of interference between blades 10b and 12b in the region where their orbits overlap.

The rotating cutter assemblies tend to generate circumferential air streams traveling in the same direction as the blades. This, as well as the mechanical sweeping action of the blades, serves first to carry the cut material generally outward toward the side skirts 28 and 30, then rearwardly along the inside faces of the skirts, causing it finally to be discharged through the rear central opening 32.

Figure 5:
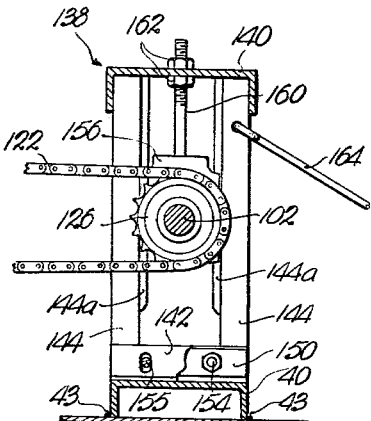
FIG. 5 is a sectional elevation taken along the line 5—5 of FIG. 4 in the direction of the arrows.
Figure 6:
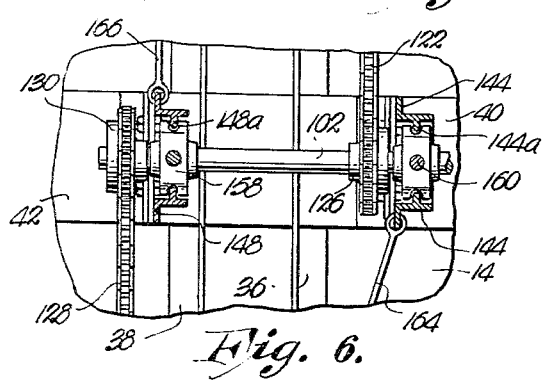
FIG. 6 is a sectional view taken along the line 6—6 of FIG. 4 in the direction of the arrows.

Deck 14 is strengthened and reinforced by framework elements 36 to 50 inclusive, all of which lie on its upper surface and are suitably secured thereto by welding. More particularly, frame elements 36 and 38 are angle iron members extending transversely of the deck from edge to edge. Along the center line of the housing, inverted channels 40 and 42 extend forwardly and rearwardly from these transverse members, the lowermost edges of the channels being welded to the deck as shown at 43 (FIG. 5). On either side of channel 40, a pair of angle iron reinforcing members 44 and 46 extend diagonally forward from the transverse frame member 36, and adjacent to the leading edge of the mower housing 16 they have sleeve-like journals 52 and 54 welded thereto. Similarly, on either side of channel 42, a pair of channels 48 and 50 extend rearwardly from the transverse frame member 38 and, adjacent to the trailing edge of the housing, have sleeve-like journals 56 and 58 welded thereto. As previously indicated, all of the aforementioned framework elements 36–50, inclusive, are suitably welded to the upper surface of deck 14 for reinforcement, and they serve in addition to carry various mechanical parts of the mower apparatus, as will be described hereinafter.

*Mower elevating mechanism*

The forward journals 52 and 54 pivotally support a rockshaft 60 to which the tongue members 18 are welded. Also welded to this shaft is an upstanding crank arm 62.

The rear journals 56 and 58 and a similar journal 64 welded to the rear of the mower housing serve to pivotally support a rockshaft 66. At its outer extremities the latter shaft has a pair of integral downwardly and rearwardly extending arms 68, each of which carries one of the ground wheels 22. An upstanding bifurcated crank arm 70 is welded to shaft 66 so as to straddle journal 64 as shown in FIG. 1.

Beside channel 40, a second channel 72 is welded to the top of deck 14, and this supports a pair of laterally spaced uprights 76 and 78 welded to its side flanges. Between the two uprights there is a lever arm 80 carried on a pivot pin 81 whose ends are supported by the respective uprights near their upper extremity. As best seen in FIG. 3, the upper end of lever 80 is hingedly connected by a link 82 to the upper end of crank arm 70, while the lower end of lever 80 is hingedly connected by a link 84 to the upper end of crank arm 62.

A conventional hydraulic cylinder 86 has the end of its housing hinged to a cross pin 87 on the uprights 76, 78, its piston rod 88 being hingedly coupled to the upright arm 62. Cylinder 86 is connected by flexible hydraulic lines (not shown) to the hydraulic system of the towing tractor so that it can be controlled by the tractor operator without leaving his seat. This permits the operator to adjust the height of the mower at will.

In FIG. 3, the mower is shown somewhat elevated, as would be the case, for example, when being towed on the highway to or from the mowing site. To lower the machine for mowing merely involves shifting piston 90 in the operator-controlled hydraulic cylinder 86 to the left. This, of course, draws the upper end of crank arm 62 rearwardly which, in turn, through link 84, lever 80, and link 82, draws the upper end of the crank arm 70 forwardly. Referring still to FIG. 3, rockshaft 60 and its attached tongue 18 thus are turned counterclockwise by crank 62 while, at the same time, rockshaft 66 and its attached arms 68 are turned clockwise. Bearing in mind that the forward end of tongue 18 is supported at a fixed height above the ground by the tractor hitch 20, it will be evident that the rearward movement of crank arm 62 has the effect of lowering pivot 60 relative to hitch 20 and thus lowering the front of the mower housing. Similarly, since the rear ends of arms 68 are supported at a fixed height above the ground by the axles of wheels 22, the forward movement of crank 70 has the effect of lowering pivot 66 and the rear of the mower housing.

Inasmuch as any change in the height of the front of the mower housing is accompanied by a corresponding change in the height of the rear, the housing will remain substantially level regardless of elevation. If different tractors are employed from time to time to tow my mower they may, of course, have hitches 20 at different heights of the ground. Preliminary leveling of the mower, regardless of the height of the hitch, may be accomplished by means of link 84 which is adjustable in length for this purpose.

In making the aforementioned adjustment in the length of link 84, it will be obvious that, if desired, the front of the mower can be set so that it is slightly higher or lower than the rear—in other words so that the plane of the orbits in which blades 10b and 12b travel is pitched slightly forward or rearward relative to the plane of the ground. In practice, it usually is preferable that the plane of the orbits be horizontal (i.e., parallel to the ground) or, in some cases, pitched very slightly forward so that the blades are closest to the ground as they travel under the leading edge of the mower housing.

Not only is the cutting height of the mower readily controlable by means of hydraulic cylinder 86, but also this arrangement makes it possible for the tractor operator, when he has completed mowing a swath the length of the field, to elevate the mower while making a turn and then to lower the mower once more to cutting height as he begins his return run across the field. Referring to FIG. 3, it will be understood that piston 90 will be shifted all the way to the right in cylinder 86 in order to obtain maximum elevation of the mower. As such elevation of the mower makes it unnecessary to halt the rotation of the mower blades while executing a turn between two mowing runs across the field, turns can be made very quickly and there is no danger of injury to the blades or other mechanical parts even though the margin of the field is characterized by rougher terrain or greater prevalence of rocks or other foreign objects than the area being mowed. Also, elevating the mower during turns eliminates the scattering of cut material that would occur if mowing continued through the turn.

When the mower is lowered to the desired cutting height, I prefer that at least the major part of the weight of the forward portion be carried by a pair of caster wheels 92, each of which has an upstanding post 93 arranged to swivel in a vertical journal 94. The latter journals are welded to the projecting forward ends of the pair of tubular struts 95, a reinforcing gusset plate 96 being provided between each journal and its supporting strut to assist in holding the journal upright. The rear end of each strut is welded to the transverse frame member 36 of the mower housing, and a downwardly extending brace 97 welded to the strut is bolted or otherwise suitably secured to the forward flange 24 of the housing as shown in FIG. 3.

The post 93 of each caster wheel has thrust collars 98 adjacent to the ends of the associated journal 94 to maintain the wheel in a predetermined vertical position relative to the mower housing, while permitting the wheel to swivel freely. However, the thrust collars are secured to the post by set screws which can be loosened to permit upward or downward adjustment of the post, it being understood that the post is adjusted so that the tread of wheels 92 rests solidly on the ground when the mower is lowered to the desired cutting height.

Blade drive mechanism

Power for driving the mower blades is suplied by a conventional power take-off shaft 100 on the rear of the towing tractor. This is connected to the main shaft 102 of the mower by means of an intermediate shaft 104 and universal joints 106 and 108. The forward end of the shaft 104 is telescopingly received in a sleeve 109 associated with the universal joint 108, the shaft and sleeve having splined connection which will accommodate slight axial shifting of the shaft 104 in the sleeve during raising or lowering of the mower, without impairing the transmission of torque to the main shaft 102.

Directly over the center of the cutter assembly 10, a standard gear box 110 is fixedly secured to the top of the deck between the transverse frame members 36 and 38. An identical gear box 112 is secured to the deck over the center of cutter assembly 12. Both gear boxes have vertical shafts (114 and 116) which extend downwardly through suitable apertures in the deck to support the respective cutter assemblies. Connected by beveled gearing to the vertical shafts for driving same, each box has a horizontal shaft (118, 120). However, as best seen in FIG. 1, the two gear boxes, although identical, are so positioned that the horizontal shaft 118 of box 110 extends from the box toward the forward edge of the mower housing, while the corresponding shaft 120 extends from the gear box 112 toward the rear edge of the housing.

Shaft 118 is coupled to the main drive shaft 102 by a chain 122 and sprockets 124 and 126. Similarly, shaft 120 is coupled to the main shaft by a chain 128 and sprockets 130 and 132. Viewed from the rear of the machine (FIG. 2) the driving and driven sprockets all turn clockwise, and chains 122 and 128 travel in the direction indicated by the arrows. Although the horizontal input shafts 118 and 120 of the gear boxes 110 and 112 turn in the same direction, the fact that the two boxes are reversed in orientation (with shaft 118 extending forwardly and shaft 120 extending rearwardly) causes the mower blades 110b to travel counterclockwise (FIG. 1) while blades 12b travel clockwise, as described hereinbefore. Also, the use of two chain and sprocket drives, both powered by a common shaft 102, absolutely insures that the blades of the respective rotors remain in predetermined phase relationship such that blades 10b alternate with blades 12b in passing through the region where the orbits of the respective blades overlap. This makes it absolutely impossible for the blades on one rotor to collide or otherwise interfere with those on the other.

The main drive shaft 102 extends through and is supported by a rigid stand 138. More particularly, the stand comprises a channel shaped top member 140 welded to four legs formed of angle iron; a cross bar 142 is welded at its ends to the lower extremities of the forward legs 144, and in like fashion a crossbar 146 is welded to the lower ends of the rear legs 148.

Adjacent to the respective crossbars, a pair of angle iron brackets 150 and 152 are welded to the central frame members 40 and 42 of the mower housing, and the crossbars are secured to these brackets by bolts 154 and 155.

Figure 4:
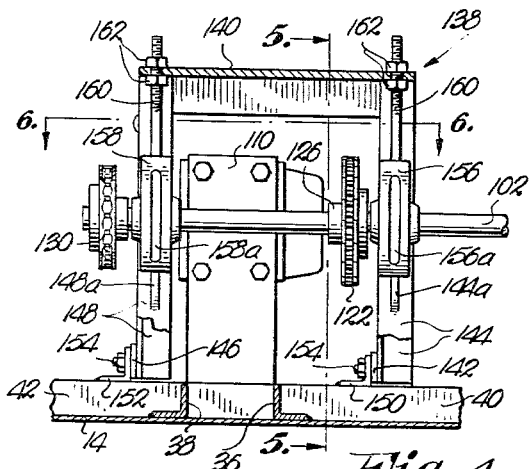
FIG. 4 is an enlarged fragmentary detail of a portion of the mower drive mechanism.

Shaft 102 is journaled in a pair of bearing blocks 156 and 158, the former being positioned between the forward legs 144 of the stand and the latter between the rear legs 148. Each pair of legs has oppositely disposed vertical ribs (144a and 148a) on which the associated bearing block can slide vertically, both sides of each block being grooved as shown at 156a and 158a (FIG. 4) to slidably receive these ribs.

Each bearing block has an integral threaded stem 160 extending upwardly therefrom through a suitable aperture in the top member 140. Nuts 162 on the threaded ends of the two stems hold the bearing blocks in desired vertical position. By loosening the two nuts 162 above member 140 and then tightening the two nuts below the member, or vice versa, the bearing blocks 156, 158 can be adjusted upwardly or downwardly at will. Thus the sprockets 126 and 130 which drive the chains 122 and 128 can be on the same level as the driven sprockets 124 and 132 or can be elevated above this level by any desired amount; as will be readily understood from FIG. 2, this adjustment affords a convenient means for adjusting the tightness of the drive chains.

In this connection, it should be explained that for particular mowing jobs it sometimes is convenient to remove the driven sprockets 124 and 132 and replace them with sprockets of larger or smaller diameter for the purpose of decreasing or increasing the speed at which the cutter blades are driven. Interchanging sprockets can be effected easily and quickly in the customary fashion, e.g., by removably securing the sprockets to their respective shafts by set screws or the like. If the substituted sprockets are very materially larger or smaller than the size of those they replace, it will be understood that drive chains 122 and 128 can be lengthened or shortened by adding or removing links as desired.

It will be further understood that just as the two driving sprockets 126 and 130 should be alike in diameter and the two driven sprockets 124 and 132 should be alike in diameter, so also should the two drive chains 122 and 128 have the same number of links and be of equal length. Even when such nominally is the case, it sometimes happens that because of manufacturing tolerances or due to differences in wear, etc., one of the drive chains will be slightly more slack than the other. With this in mind, provision is made for tilting stand 138 slightly to the left or to the right as viewed in FIG. 2, thereby to equalize the tension on the two chains.

In order to accomplish this, the left-hand mounting bolts 155 are received in vertically elongated holes in the cross pieces 142 and 146 at the bottom of the stand as shown in FIG. 5, so that when these bolts are loosened, the stand can rock on the aligned right-hand bolts 154 as pivots. The direction and amount of tilting is controlled by diagonal tie rods 164 and 166 which are connected at their upper ends to the forward and rear legs of the stand. The threaded lower ends of the rods are received in apertured brackets 168 and 170 welded to the frame members 36 and 38, the ends of the rods being anchored to the brackets by adjusting nuts 172.

It will be understood, of course, that bolts 154 and 155 are tightened to clamp the bottom cross pieces of the stand tightly to their angle iron supports 150 and 152 when the stand has been adjusted under control of nuts 172 to such upright or slightly inclined position as may be needed in order to correct for any difference in the tension of chains 122 and 128.

The adjustment of chain tension obtained by raising or lowering the drive sprockets under the control of nuts 162, together with that obtained by tilting stand 138 under control of adjustment nuts 172, as just described, makes it possible to deal with all conditions encountered in practice. Sprockets of any desired size can be employed on the gear boxes 110 and 112, different sizes being freely interchangeable. Whether a change of sprockets will require altering the length of the drive chains by the addition or removal of links on any given occasion naturally will depend on the magnitude of the change made in the sprocket size, as previously suggested, but the final adjustment of tension always will be controlled by nuts 162 and 172.

As noted earlier, the use of chain and sprocket drives for the two cutter assemblies insures maintenance of positive synchronization such that there can be no interference between blades on the respective rotors, even though the blades on both rotors cut at identically the same height, with sufficient overlapping of their orbits to insure that no grass is left uncut between the two. The side-by-side disposition of the cutter assemblies (whereby a line drawn between their centers of rotation is normal to the path of travel of the mower) permits cutting a swath of the greatest possible width for cutters of given orbit diameter. In commercial versions of my mower, for example, the blades on each rotor preferably measure approximately six feet from tip to tip, and actual field usage confirms that these units permit high speed mowing of swaths twelve feet wide with ease. Even in sizes as large as this, the mower travels with exceptional stability, and elevates smoothly and surely for the purpose of making rapid turns as explained hereinbefore.

Due to the opposite rotation of the two cutter assemblies 10 and 12 in the direction indicated by the arrows in FIG. 1, the grass cut by the respective assemblies travels different, noninterfering paths to the common discharge opening 32 at the rear of the housing. Since neither cutter throws material into the path of the other, recutting and maceration is minimized; cut material is discharged promptly and in good condition, clearing the housing in an orderly fashion which facilitates the efficient cutting of new material as the mower advances along the ground.

The opposite rotation of the two cutter assemblies by which these results are obtained does not require complex or dissimilar drive systems. Indeed, according to the invention, even the gear boxes 110 and 112 can be identical standard units, the opposite rotation of their output shafts being achieved simply by mounting the respective gear boxes so that the input shaft 118 of one extends forwardly, while the corresponding shaft 120 of the other extends rearwardly. At the same time this facilitates the use of interchangeable sprocket sizes on these shafts to control the rotational speed of the cutter assemblies, as explained earlier.

From the foregoing it will be seen that my invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, I claim:
1. In a power mower,
an ambulant open bottom housing having a top deck with depending side flanges spaced apart by a distance approximately double the fore-to-aft dimension of the housing,
a pair of identical gear boxes mounted on said deck on opposite sides of the longitudinal center line of said housing and equidistant therefrom,
a support mounted on said deck intermediate said gear boxes,
a main drive shaft carried by said support in a position generally parallel to the longitudinal center line of the housing,
a souce of power connected to said shaft for turning same,
each of said gear boxes having a generally horizontal power input shaft parallel to said main drive shaft, one of said input shafts extending from its gear box toward the front of the mower housing, and the other extending from its gear box toward the rear of the housing,
a chain and sprocket drive coupling one of said input shafts to said main shaft to receive power therefrom,
a second chain and sprocket drive coupling the other input shaft to said main shaft to receive power therefrom,
each gear box having a downwardly extending vertical power output shaft coupled to and driven by the power input shaft of that box,
a rotary cutter carried by each power output shaft on the lower portion thereof,
each cutter having a cutting orbit whose radius is equal to approximately half of the fore-to-aft dimension of said housing, said radius being slightly greater, however, than the distance between its center and the longitudinal axis of the housing, whereby the orbits of the respective cutters overlap slightly.
2. A mower as in claim 1,
wherein each rotary cutter has a series of circumferentially spaced cutter blades, the blades of the respective cutters being coplanar.
3. A mower as in claim 1, having means for shifting said main shaft laterally in a generally horizontal direction to adjust the relative tension of the drive chains for the respective gear boxes.
4. A mower as in claim 1, having means for shifting said main shaft in a generally vertical direction to adjust the tension of the drive chains for both gear boxes simultaneously.
5. In a power mower of the type having a pair of rotary cutters which are rotatable about laterally spaced vertical axes,
means for driving said cutters in opposite directions comprising
a pair of identical gear boxes each having a downwardly extending vertical shaft carrying one of said cutters, each of said gear boxes also having a horizontal power input shaft extending from the box,
a base supporting said gear boxes with said input shafts parallel to one another but with the respective ones thereof extending in opposite directions from a plane passing through the axes of the two vertical shafts,
a stand positioned on the base between the two gear boxes,
a horizontal main drive shaft carried by said stand parallel to said input shafts, a chain and sprocket drive coupling one of said input shafts to said main shaft to receive power therefrom,
and a second chain and sprocket drive coupling the other input shaft to said main shaft to receive power therefrom.

6. A mower as in claim 5 having means for shifting said main shaft laterally in a generally horizontal direction to adjust the relative tension of the drive chains for the respective gear boxes.

7. A mower as in claim 5 having means for shifting said main shaft in a generally vertical direction to adjust the tension of the drive chains for both gear boxes simultaneously.

8. A mower as in claim 5,
wherein said main drive shaft is vertically adjustable in said stand,
said stand being rockably mounted on said base and having means to adjust the inclination of the stand relative to vertical.

References Cited by the Examiner

UNITED STATES PATENTS

| | | | |
|---|---|---|---|
| 2,005,204 | 6/35 | Poynter. | |
| 2,050,120 | 8/36 | Pizarro | 172—59 X |
| 2,505,952 | 5/50 | Fergason. | |
| 2,682,142 | 6/54 | Clark | 56—25.4 X |
| 2,753,674 | 7/56 | Cunningham et al. | 56—6 |
| 2,816,410 | 12/57 | Nobles | 56—25.4 |
| 2,818,269 | 12/57 | Northcote et al. | 56—25.4 X |
| 2,830,519 | 4/58 | Chandler et al. | 172—328 |
| 2,866,281 | 12/58 | Breaux | 172—428 X |
| 2,869,304 | 1/59 | Colburn | 56—25.4 |
| 2,967,574 | 1/61 | Morkoski | 172—328 |
| 2,991,612 | 7/61 | Holmes | 56—25.4 |
| 3,000,165 | 9/61 | Lill | 56—25.4 |
| 3,043,082 | 7/62 | Northcote et al. | 56—503 |
| 3,053,033 | 9/62 | Maguire | 56—25.4 |
| 3,063,226 | 11/62 | Pfauser | 56—25.4 |
| 3,068,630 | 12/62 | Caldwell | 56—6 |
| 3,115,190 | 12/63 | Listiak | 172—59 X |

FOREIGN PATENTS 1,265,333  5/61  France.

ANTONIO F. GUIDA, *Acting Primary Examiner.*

J. SPENCER OVERHOLSER, T. GRAHAM CRAVER, *Examiners.*